(12) United States Patent
Sodemann et al.

(10) Patent No.: US 10,579,144 B2
(45) Date of Patent: Mar. 3, 2020

(54) RESONANT VIBRATION HAPTIC DISPLAY

(71) Applicants: Angela Sodemann, Gilbert, AZ (US);
Nathan Eastburn, Mesa, AZ (US);
Kendra Kim, Chandler, AZ (US)

(72) Inventors: Angela Sodemann, Gilbert, AZ (US);
Nathan Eastburn, Mesa, AZ (US);
Kendra Kim, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/911,276

(22) Filed: Mar. 5, 2018

(65) Prior Publication Data
US 2018/0253147 A1 Sep. 6, 2018

Related U.S. Application Data

(60) Provisional application No. 62/466,636, filed on Mar. 3, 2017.

(51) Int. Cl.
| | |
|---|---|
| *G06F 3/01* | (2006.01) |
| *G06F 3/041* | (2006.01) |
| *G09B 21/00* | (2006.01) |
| *B06B 1/04* | (2006.01) |

(52) U.S. Cl.
CPC .............. *G06F 3/016* (2013.01); *B06B 1/045* (2013.01); *G06F 3/041* (2013.01); *G09B 21/004* (2013.01)

(58) Field of Classification Search
None
See application file for complete search history.

(56) References Cited

U.S. PATENT DOCUMENTS

| 2009/0002328 A1* | 1/2009 | Ullrich | G06F 3/016 345/173 |
|---|---|---|---|
| 2009/0184809 A1* | 7/2009 | Wagner | G06K 9/00355 340/407.2 |
| 2014/0247227 A1* | 9/2014 | Jiang | G06F 3/016 345/173 |
| 2018/0164888 A1* | 6/2018 | Ham | H01L 41/0477 |

OTHER PUBLICATIONS

"BrainPort V100 Vision Aid," BrainPort V100 Vision Aid. [Online]. Available: http://www.new.wicab.com/. [Accessed: Jun. 1, 2016].
A. Iqbal, U. Farooq, H. Mahmood, and M. U. Asad, "A Low Cost Artificial Vision System for Visually Impaired People," in Second International Conference on Computer and Electrical Engineering, 2009. ICCEE '09, 2009, vol. 2, pp. 474-479.

(Continued)

*Primary Examiner* — Nicholas J Lee
(74) *Attorney, Agent, or Firm* — Snell & Wilmer L.L.P.

(57) ABSTRACT

A haptic display system may comprise an array of vibratory elements, each vibratory element having a natural frequency different from the natural frequency of every other vibratory element in the array, a voice coil coupled to the array to impart vibrational energy to the array, and a microcontroller coupled to the voice coil to drive the array.

16 Claims, 8 Drawing Sheets

(56) References Cited

OTHER PUBLICATIONS

M. Bousbia-Salah, A. Redjati, M. Fezari, and M. Bettayeb, "An Ultrasonic Navigation System for Blind People," in IEEE International Conference on Signal Processing and Communications, 2007. ICSPC 2007, 2007, pp. 1003-1006.
"Precision Microdrives—Micro DC Motors." [Online]. Available: https://www.precisionmicrodrives.com/. [Accessed: May 30, 2016].
D. Dakopoulos, S. K. Boddhu, and N. Bourbakis, "A 2D Vibration Array as an Assistive Device for Visually Impaired," in Proceedings of the 7th IEEE International Conference on Bioinformatics and Bioengineering, 2007. BIBE 2007, 2007, pp. 930-937.
S. Akhter, J. Mirsalahuddin, F. B. Marquina, S. Islam, and S. Sareen, "A Smartphone-based Haptic Vision Substitution system for the blind," in Bioengineering Conference (NEBEC), 2011 IEEE 37th Annual Northeast, 2011, pp. 1-2.
K. J. O. Callaghan and M. J. O. Mahony, "An obstacle segmentation and classification system for the visually impaired," in 2010 International Symposium on Optomechatronic Technologies (ISOT), 2010, pp. 1-6.
J. Pasquero and V. Hayward, "STRESS: A practical tactile display system with one millimeter spatial resolution and 700 Hz refresh rate," in in Proc. Eurohaptics 2003, 2003, pp. 94-110.
S. A. Wall and S. Brewster, "Sensory substitution using tactile pin arrays: Human factors, technology and applications," Signal Process., vol. 86, No. 12, pp. 3674-3695, Dec. 2006.
M. Benali-Khoudja, M. Hafez, and A. Kheddar, "VITAL: An electromagnetic integrated tactile display," Displays, vol. 28, No. 3, pp. 133-144, Jul. 2007.
P. Bach-y-Rita and S. W Kercel, "Sensory substitution and the human-machine interface," Trends Cogn. Sci., vol. 7, No. 12, pp. 541-546, Dec. 2003.
Y. Visell, "Tactile sensory substitution: Models for enaction in HCI," Interact. Comput., vol. 21, No. 1-2, pp. 38-53, Jan. 2009.
L. A. Jones and N. B. Sarter, "Tactile Displays: Guidance for Their Design and Application," Hum. Factors J. Hum. Factors Ergon. Soc., vol. 50, No. 1, pp. 90-111, Feb. 2008.
김나리, 최명애, 이경완, 김민선, and 마병림, "Assessment of tactile acuity by vibrotactile stimulation in blind and deaf humans," 시각장애연구, vol. 29, No. 3, pp. 49-62, Sep. 2013.
P. Grant et al., "The Functional Performance of the BrainPort V100 Device in Persons Who Are Profoundly Blind," J. Vis. Impair. Blind., vol. 110, No. 2, pp. 77-88, Mar. 2016.
G. Pineda Garcia, J. Ortiz Bejar, and F. Mercado Miramontes, "A prototype helping device for the visually impaired using an optical to mechanical transducer," in 2013 IEEE International Autumn Meeting on Power, Electronics and Computing (ROPEC), 2013, pp. 1-4.

* cited by examiner

RESONANT VIBRATION HAPTIC DISPLAY

CROSS-REFERENCE TO RELATED APPLICATIONS

This application claims priority to, and the benefit of, U.S. Provisional Patent Application No. 62/466,636 filed on Mar. 3, 2017 and entitled "RESONANT VIBRATION HAPTIC DISPLAY". The entire contents of the foregoing application are hereby incorporated by reference for all purposes.

FIELD OF THE DISCLOSURE

The present disclosure relates to haptic systems, and in particular to haptic arrays configured for use as display analogs for the visually impaired.

BACKGROUND

A haptic display is a device used to convert visible images into a form that can be perceived through touch. A vibratory haptic display is a device which does this through an array of vibrating elements which correspond to visual pixels. Current approaches for haptic displays utilize either vibration motors or electrode patches. These current-technology vibratory haptic displays are limited in resolution by two primary factors: (1) limitations on how small vibration motors or electrode patches can be made; and (2) the necessity of using one pin of a microcontroller to control the amount of vibration of each motor, or the amount of charge on each electrode patch. These requirements limit the number of vibration motors or electrodes which can be controlled by a single microcontroller or placed within a single haptic display, resulting in the limitation of low-resolution of the displays. The low resolution of vibratory haptic displays severely limits their effectiveness. Accordingly, improved vibratory haptic displays are desirable.

SUMMARY OF THE DISCLOSURE

A haptic display system may comprise an array of vibratory elements, each vibratory element having a natural frequency different from the natural frequency of every other vibratory element in the array, a voice coil coupled to the array to impart vibrational energy to the array, and a microcontroller coupled to the voice coil to drive the array.

In exemplary embodiments, the array of vibratory elements may further comprise a base coupled to each of the vibratory elements. Each vibratory element may comprise a length different from every other vibratory element in the array. Each vibratory element may comprise a diameter different from every other vibratory element in the array. Each vibratory element may comprise the same material. Each vibratory element may comprise one of a circular or rectangular cross-sectional shape. Each vibratory element is may be configured to vibrate at a frequency different from every other vibratory element in the array. Each vibratory element may be produced by one of fused deposition modeling, stereolithography, direct metal laser sintering, electrical discharge machining, or a wire drawing machining process. The array of vibratory elements may comprise a grid of vibratory elements comprising multiple rows and multiple columns. Each row may comprise vibratory elements having equal lengths and each column comprises vibratory elements having equal diameters.

An interface for a haptic display system may comprise a plurality of circular apertures, and a plurality of rectangular apertures wherein each rectangular aperture of the plurality of rectangular apertures is configured to receive a vibratory element of an array of vibratory elements.

In exemplary embodiments, a length of each rectangular aperture of the plurality of rectangular apertures may be approximately twice a length of each vibratory element of the array of vibratory elements. The array of vibratory elements may be configured to vibrate in one direction in the plurality of rectangular apertures. The interface may be configured to prevent a user's skin from excessively damping vibrations of the array of vibratory elements. The interface may be configured to allow the plurality of vibratory elements to excite a user's dynamic touch receptors.

A method for displaying an image via a haptic display system may comprise converting a brightness value for each pixel of the image into an amplitude, matching a location of each pixel in the image to the location of a vibratory element in an array of vibratory elements in the haptic display, each vibratory element having a natural frequency different from the natural frequency of every other vibratory element in the array, and energizing the array of vibratory elements to cause each vibratory element to vibrate with an amplitude proportional to the brightness level of the corresponding pixel.

In exemplary embodiments, the method may further comprise inserting the array of vibratory elements into an interface configured to prevent a user's skin from damping vibration of the vibratory elements. Converting a brightness value for each pixel may comprise only converting a brightness value for each pixel that changes relative to a previous image. Each vibratory element may have a natural frequency in a range of frequencies that can be produced by a single speaker.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting. The contents of this section are intended as a simplified introduction to the disclosure, and are not intended to limit the scope of any claim.

BRIEF DESCRIPTION OF THE DRAWINGS

The accompanying drawings are included to provide a further understanding of the present disclosure and are incorporated in, and constitute a part of, this specification, illustrate exemplary embodiments, and together with the description, serve to explain principles of the disclosure.

DETAILED DESCRIPTION

Figure 1:
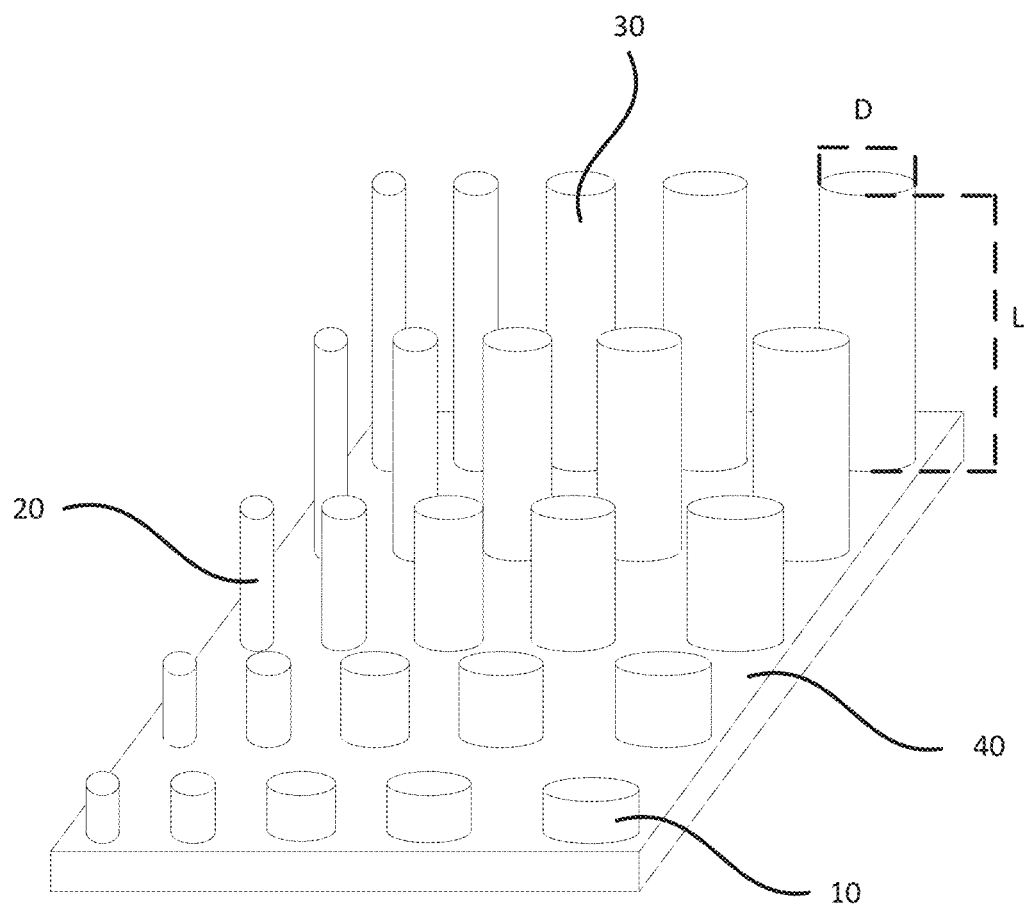
FIG. 1 illustrates an exemplary array of pins manufactured on a base in accordance with an exemplary embodiment.

The following description is of various exemplary embodiments only, and is not intended to limit the scope, applicability or configuration of the present disclosure in any way. Rather, the following description is intended to provide a convenient illustration for implementing exemplary embodiments including the best mode. As will become apparent, various changes may be made in the function and arrangement of the elements described in these embodiments without departing from principles of the present disclosure.

For the sake of brevity, conventional techniques for haptic displays, 3-D printing, and/or the like may not be described in detail herein. Furthermore, the connecting lines shown in various figures contained herein are intended to represent exemplary functional relationships and/or physical or communicative couplings between various elements. It should be noted that many alternative or additional functional relationships may be present in a practical haptic display system.

Haptic Display.

Principles of the present disclosure contemplate vibratory haptic display systems that do not use vibration motors or electrodes as the vibrating elements. Rather, in various exemplary embodiments, each vibrating element is a single 'pin' oriented vertically and attached to a base, so that it acts as a cantilever beam. A cantilever beam has a resonant frequency which depends upon the length, cross-sectional area, material, and cross-sectional shape of the beam. An exemplary system utilizes an array of pins, which function similar to beams, each with a slightly different length, cross-sectional area, and cross-sectional shape, so that each pin has a different resonant frequency.

Embodiments of the present haptic display system utilize a single speaker to produce many frequencies at varying amplitudes simultaneously. A single speaker can control the vibration of many pins simultaneously, thereby reproducing an image through touch. An exemplary procedure for utilizing a haptic display system is as follows: a grayscale image is captured from a camera. In a grayscale image, the gray level of each pixel is represented, for example by a single 8-bit brightness value. A waveform is computed as a sum of sine waves in which the amplitude of each sine wave corresponds to the brightness value of a pixel, and the frequency of each wave corresponds to the natural frequency of the pin in the physical location corresponding to the pixel location. The resultant waveform is played through the speaker for an amount of time equal to the inverse of the framerate of the camera. Then, the process repeats with a new camera image being captured. The top of the pin array is placed in contact with a user's skin, so that the motion of the tips of the pins is perceived through touch as vibration.

As compared to prior approaches, exemplary embodiments do not require the device to be placed on the tongue in the mouth, compared to current electrode-type haptic displays. Moreover, an exemplary system can be controlled by only a few analog pins of a microcontroller, rather than thousands of pins required by current haptic displays. Compared to other vibratory or electrode-type haptic displays, exemplary systems are much less expensive to manufacture due to the simplicity of each vibrating element.

Haptic Display Structure.

Referring now to FIG. 1, an array of vertical pins manufactured on a base is illustrated in accordance with an exemplary embodiment. Each pin has a resonant frequency that depends upon the material, the cross-sectional area, cross-sectional shape, and length. For descriptive purposes, three pins, pin 10, pin 20, and pin 30 are referenced in FIG. 1 on a base, 40. As can be seen, each pin comprises a diameter, D, and a length, L. Pins 10, 20, and 30 may make up a portion of a pin grid (in this embodiment, a 5×5 grid), with each pin having a different resonant frequency. In the exemplary embodiment of FIG. 1, pin 30 may have length greater than pin 20, which may have a length greater than pin 10. Pin 10 may have a diameter greater than pin 30, which may have a diameter greater than pin 20. The diameter, D, length, L, material, and cross-sectional shape of each pin 10, 20, 30, and the other pins may be designed such that each pin may have a different resonant frequency than all other pins. The circular cross-sectional shape insures that each pin has just one fundamental resonant frequency, however the cross-sectional shape of the pins are not limited in this regard, and may comprises alternative cross-sectional shapes. For example, in exemplary embodiments, the pins may comprise a rectangular cross-sectional shape comprising a width rather than a diameter. In exemplary embodiments, the array of pins may comprise a grid of pins comprising multiple rows and multiple columns. Each row may comprise pins having equal lengths and each column may comprise pins having equal diameters, however, the array of pins is not limited in this regard. In exemplary embodiments, each row may comprise pins having a length unequal to every other pin in the same row and each column may comprise pins having a diameter unequal to every other vibratory element in the same column.

When the frequency of sound does not match the frequency of a pin, that pin will vibrate with a small amplitude. This effect is known as 'resonance' or, alternately, as 'transmissibility'. As will be discussed further below, pins vibrating with a small amplitude in the haptic display will feel different to a user of the haptic displayed when compared with pins vibrating with a larger amplitude, thereby helping the user visualize a display through touch.

Figure 2:
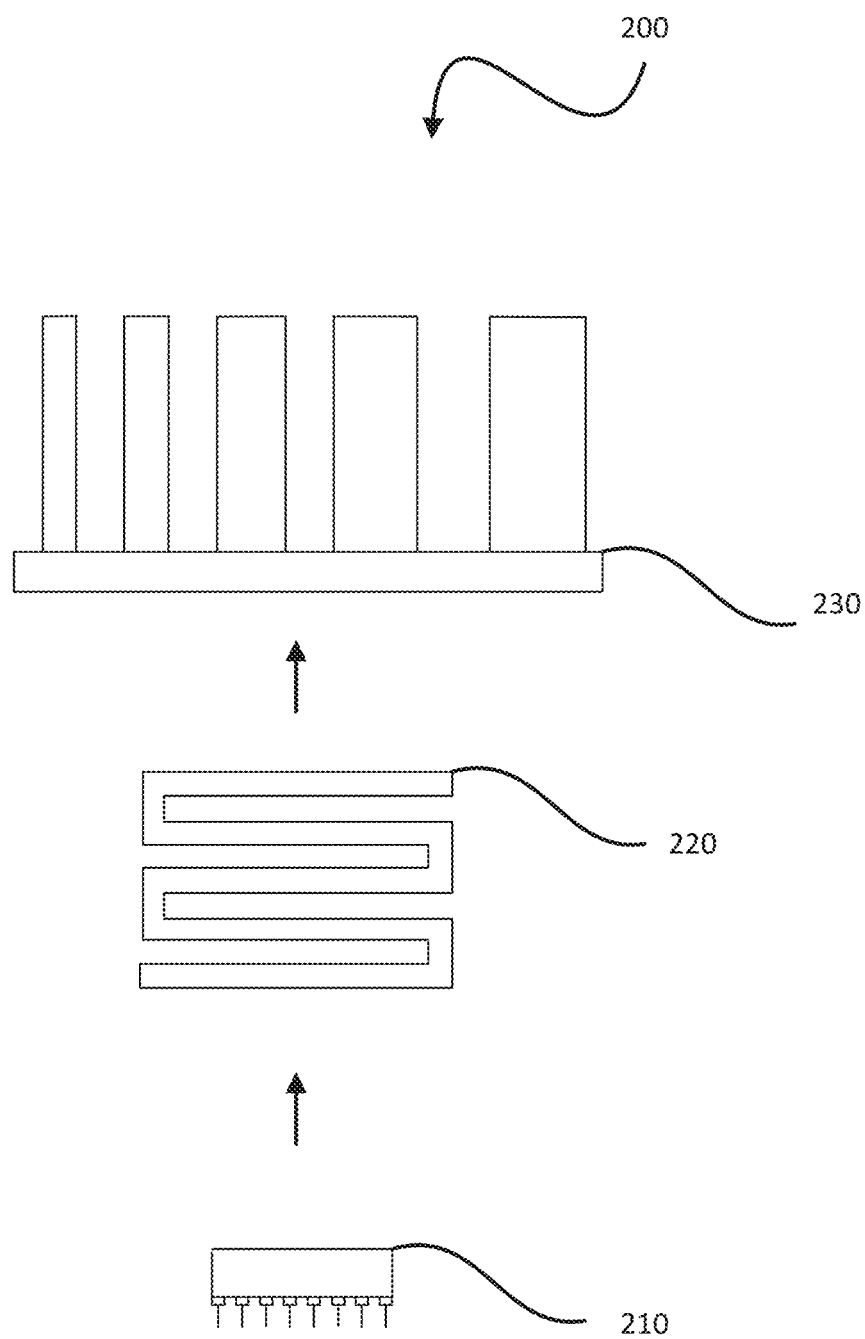
FIG. 2 illustrates an exemplary assembly of pins manufactured on a pin array, a soundwave generator, and a microcontroller in accordance with an exemplary embodiment.

With reference now to FIG. 2, an assembly 200 of pins manufactured on a pin array 230, a soundwave generator 220, and a microcontroller 210 are illustrated in accordance with exemplary embodiments. Pin array 230 may be a pin array similar to that described above with reference to FIG. 1. Soundwave generator 220 may comprise a portion of a speaker that has been modified by removing the diaphragm, but leaving the permanent magnet, voice coil, and spider intact. The voice coil of the modified speaker may be then placed in contact with the base of the pin array, and the speaker input may be connected to a single analog pin of microcontroller 210. When a sound is played through the speaker with a sound frequency matching the resonant frequency of one of the pins of pin array 230, that pin will vibrate with a large amplitude (but the sound will not be audible, because the diaphragm of the speaker has been removed) and the remaining pins with resonant frequencies not matching the sound will vibrate with lower amplitudes.

Figure 3A:
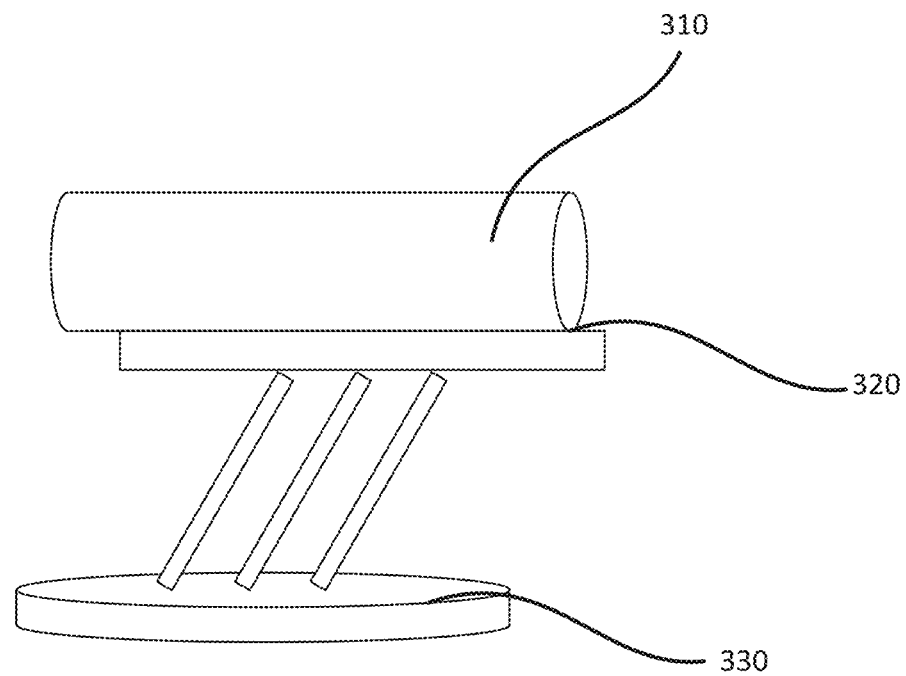
FIGS. 3A and 3B illustrate approaches to prevent touch from damping vibrations of pins in accordance with an exemplary embodiment.
Figure 3B:
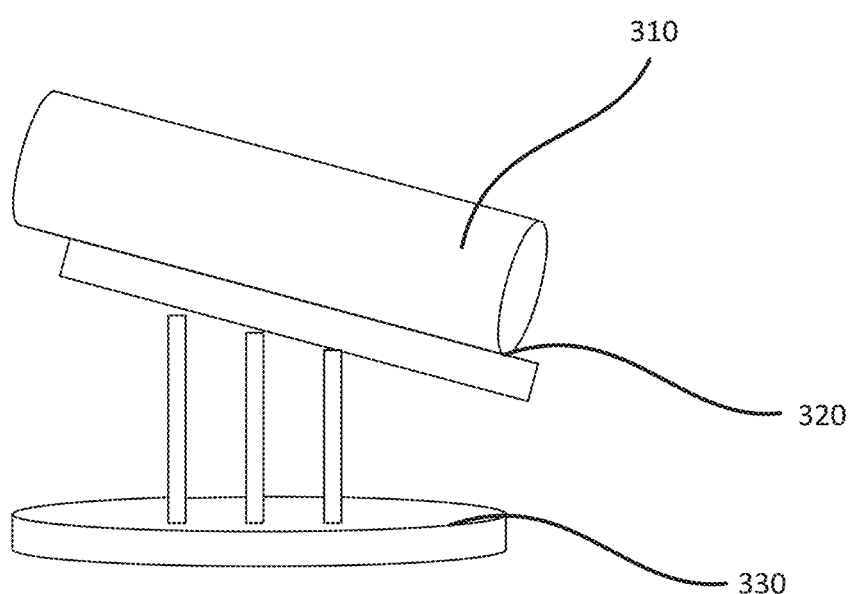

In order to prevent human touch from excessively damping pin vibrations, principles of the present disclosure contemplate mounting the pins at an angle and placing a 'cap' on top of the pins, so that vibrations are transmitted through the cap to the human skin without direct contact between the human skin and the pins. FIGS. 3A and 3B illustrate two of these possible arrangements. Each arrangement may comprise a pin array 330 (similar to that described with reference to FIG. 1), and a cap 320. A user finger may be represented by element 310. FIG. 3A illustrates pins of equal length non-perpendicular to cap 320 and a base of pin array 330. FIG. 3B illustrates pins of unequal length non-perpendicular to cap 320 but perpendicular to base of pin array 330. As can be seen, cap 320 may interface with pins of pin array 330 on one surface and with user finger 310 on an opposite surface. The vibration of the pins on pin array 330 may be transferred through cap 320 to user finger 310 without excessively damping pin vibrations on pin array 330.

Figure 4A:
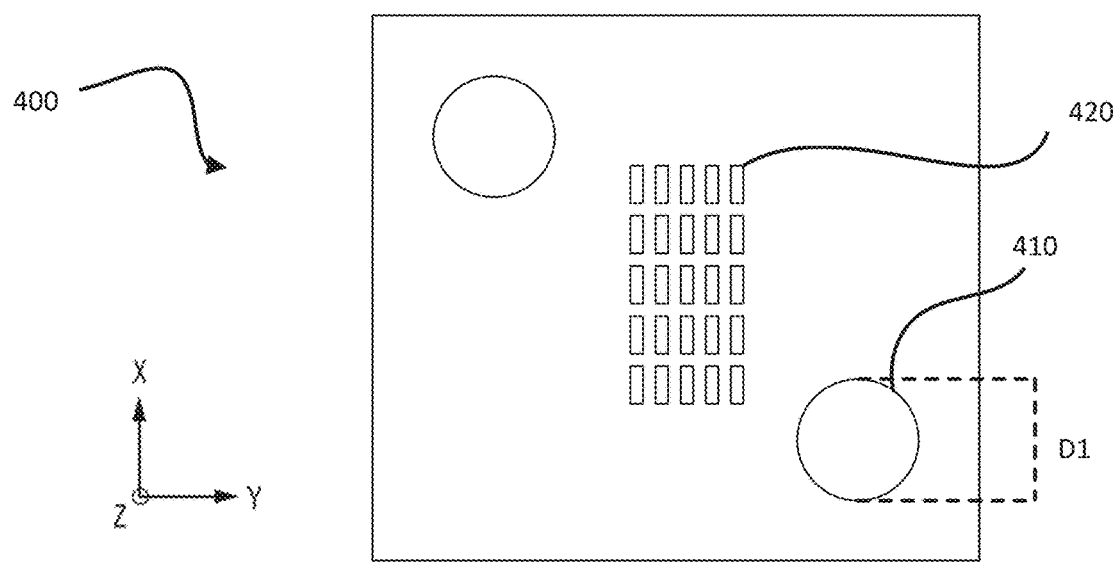
FIGS. 4A, 4B, and 4C illustrate an alternative approach to prevent touch from damping vibrations of pins in accordance with an exemplary embodiment.
Figure 4B:
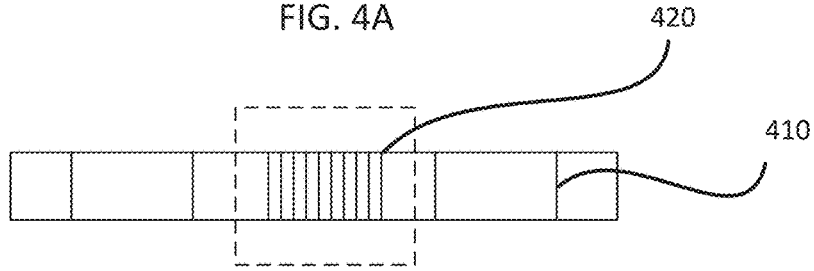
Figure 4C:
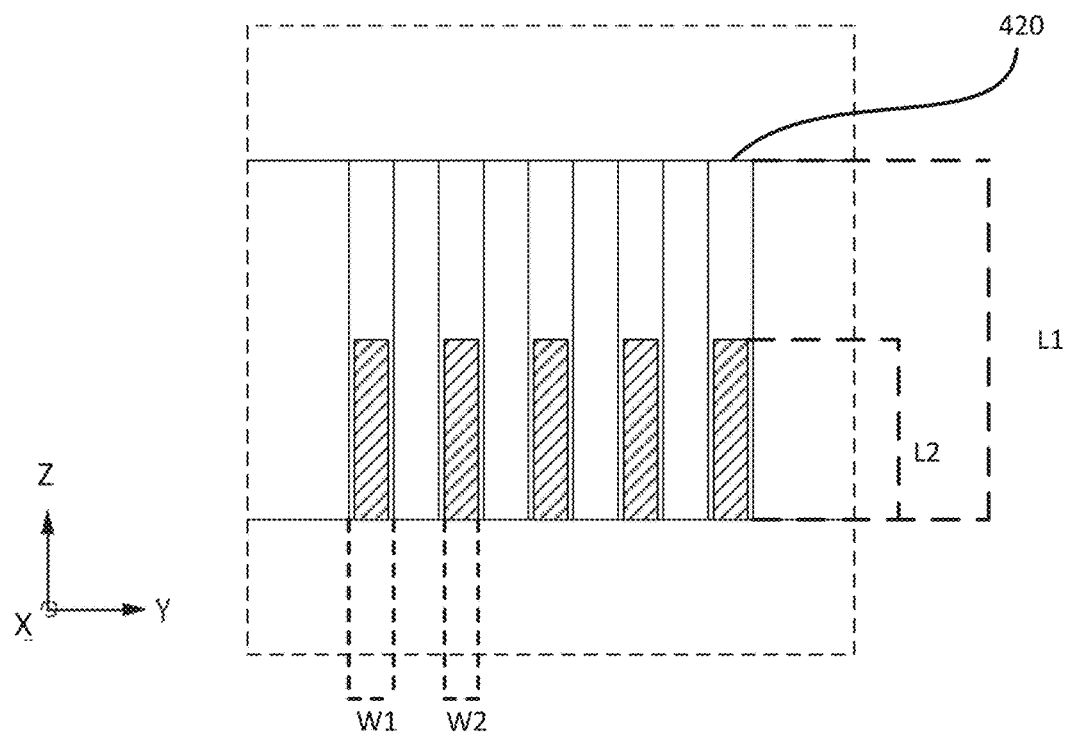

With reference now to FIGS. 4A-4C, an alternative arrangement for preventing excessive damping of the pins is illustrated in accordance with exemplary embodiments. This arrangement may include an interface 400 designed to limit contact between the pins of a pin array and a user's skin. Interface 400 may comprise a plurality of circular apertures 410 and a plurality of rectangular apertures 420. Circular apertures 410 may be configured with a diameter, D1. In exemplary embodiments, D1 may be between approximately 0.039 inches (or 1.000 mm) and 0.197 inches (or 5.000 mm), or between approximately 0.079 inches (or 2.000 mm) and 0.157 inches (or 4.000 mm). Circular apertures 410 may be configured to mount interface 400 on a threaded rod, such as an M3 threaded rod. A nut may be threaded onto the threaded rod on either side of interface 400 and be configured to adjust the positioning of interface 400 in the z-direction. The number of rectangular apertures 420 may correspond to the number of pins in the pin array. For example, a pin array comprising a 5×5 grid of pins may correspond to an interface comprising a 5×5 grid of rectangular apertures.

With further reference to FIG. 4B and FIG. 4C, interface 400 is illustrated in a side view and a detailed side view, respectively. Rectangular apertures 420 may comprise a length, L1, corresponding to a thickness of interface 400, and a width, W1. Pins of the pin array may comprise a length, L2 and a width, W2. In exemplary embodiments, W1 may be slightly larger than W2 (for example 1% to 10% larger) such that the pins are only able to vibrate in one direction (for example, in the x-direction in the current embodiment). A length, L1 of rectangular apertures 420 may be approximately twice the length, L2 of the pins. For example, in exemplary embodiments, L1 may be between approximately 0.014 inches (or 0.356 mm) and 0.034 inches (or 0.864 mm), between approximately 0.019 inches (or 0.483 mm) and 0.029 inches (or 0.737 mm), or between 0.023 inches (or 0.584 mm) and 0.025 inches (or 0.635 mm). L2 may be between approximately 0.002 inches (or 0.051 mm) and 0.022 inches (or 0.559 mm), between approximately 0.007 inches (or 0.178 mm) and 0.017 inches (or 0.432 mm), or between approximately 0.011 inches (or 0.279 mm) and 0.013 inches (or 0.330 mm). L1 may be approximately twice the length of L2 such that a top surface of the pins barely contacts a user's skin. For example, when a user places his or her hand on interface 400, the user's skin may cover the plurality of rectangular apertures 420 such that the user's skin protrudes slightly into the rectangular apertures 420. Interface 400 may be adjusted along the threaded rod in the z-axis such that a top surface of the pins of the pin array barely 'scrape' the user's skin. In this way, the pins may excite the user's dynamic touch receptors, rather than the user's static touch receptors. Further, because the force of the user's skin on the pins is minimal, damping of the pins may be reduced.

Methods of Manufacturing Pins of Pin Array.

Each pin can be manufactured by current manufacturing technologies such as 3D printing, wire EDM, or micromilling to have a diameter smaller than 0.100 mm, thus allowing a resolution similar to that of a visual image, such as 640×480, to be placed in an area the size of a human hand, while utilizing just one speaker. The manufacturing technique chosen may depend on the material being used and may include, for example, a 3D printing process among other manufacturing techniques. In exemplary embodiments, polymer pins may be made from polylactic acid (PLA) utilizing fused deposition modeling (FDM), acrylonitrile butadiene styrene (ABS) utilizing FDM, photopolymer resins utilizing stereolithography, a combination thereof, or any other suitable polymer or manufacturing technique.

In exemplary embodiments, pins comprising metal materials may be desirable due to the vibrational characteristics associated with the metal material. For example, the pins may be made from stainless steel utilizing direct metal laser sintering (DMLS), stainless steel utilizing electrical discharge machining (EDM), tool steel utilizing EDM, stainless steel utilizing a micro-wire drawing process, a combination thereof, or any other suitable metal material or manufacturing technique. Regardless of the material and/or manufacturing technique chosen, in exemplary embodiments it may be beneficial to decrease a pin diameter to increase display resolutions, while maintaining a circular-cross section to insure a single fundamental resonant frequency per pin.

In exemplary embodiments, alternative manufacturing techniques may utilized in order to produce the pins of the pin array. For example, a precision wire-drawing machine may be used to produce pins of a desired shape and size, such as a circular cross-sectional shape with a diameter of approximately 0.5 mm or less. The wire-drawing machine may comprise a draw-plate with conical holes of varying dimensions. An automated collet may be configured to be opened, moved to the draw-plate, closed to latch onto a wire, then moved away from the draw-plate to produce a straight wire comprising a desired diameter. A plurality of cutters may be positioned between the draw-plate and the collet. At least one of the cutters may be fixed in space and at least one may be configured to move along an axis. The movable cutter may be positioned such that it is a desired distance from the fixed cutter and both cutters may then be moved on an alternate axis to be positioned around a wire. A pneumatic actuator coupled to a top surface of the machine may then actuate the cutters to cut the wire to a desired length. While the actuator is described as a pneumatic actuator, above, in exemplary embodiments the actuator may be any other suitable actuator, such as a hydraulic or electromechanical actuator. After the wire has been cut, the wire may be placed in a device capable of gripping the wire to constrain wire movement. One end of the wire may be bent in order to create a hook. The wire may then be placed into an aperture of a base plate comprising a plurality of apertures. The plurality of apertures of the base plate may each comprise a diameter slightly larger than the wire diameter. The hook of the wire may be configured to prevent the wire from falling through the aperture and the wire may be fixed to the base plate utilizing a solder, resin, epoxy, adhesive, or other fixing method. The process may be repeated for each of the wires and the base plate may be turned over to display a completed pin array comprising a plurality of desired cross-sectional shape and size pins.

Pin Dimension Design Methodology.

In order to design dimensions for the vibratory pins of a high-resolution haptic display, certain constraints may be imposed, for example:

Each pin desirably has a unique natural frequency;

No pin may have a natural frequency within one or more bandwidths of the natural frequency of another pin (one bandwidth is the minimum requirement; imposing greater numbers of bandwidths in distance will further reduce crosstalk between pins);

The natural frequency of every pin shall be within the range of frequencies that can be produced by a single speaker;

The pins shall be physically equally-spaced, thus requiring that the distance between any two adjacent pins is at least equal to the diameter of the largest-diameter pin; and Every pin must have dimensions that are able to be manufactured. In other words, the difference in diameter between two pins cannot be smaller than the XY resolution of an applicable manufacturing machine, and the difference in length between two pins cannot be smaller than the Z resolution of an applicable manufacturing machine.

Because of these constraints, pin dimensions may be difficult to determine by a single equation, but may be determined instead through a process of optimization. An exemplary optimization process is illustrated in the flow-chart shown in FIG. 5. In this optimization process, first a list of all pin dimensions that can be manufactured is created, and the natural frequency and maximum vibrational amplitude of each pin is calculated. Next, all pins with natural frequencies that fall outside of the frequency range of a typical speaker (20 Hz-20 kHz) are removed from the list. Then, one pin is selected from the list according to an optimization approach. Two optimization approaches disclosed herein are the 'lowest frequency first' approach and the 'highest amplitude first' approach. In the 'lowest frequency first' approach, the first pin selected is the one with the lowest frequency; in the 'highest amplitude first' approach, the first pin selected is the one with the highest vibrational amplitude. The selected pin is added to a 'chosen' list, and removed from the list of all allowable pins. The bandwidth of the selected pin is calculated, and all pins with natural frequencies falling within the bandwidth are removed from the list of allowable pins. This process of selecting a pin according to the optimization approach and then eliminating all pins within the bandwidth is repeated until the 'allowable' list of pins is empty. The 'chosen' list of pins is then exported.

Pin Design Examples.

Figure 5:
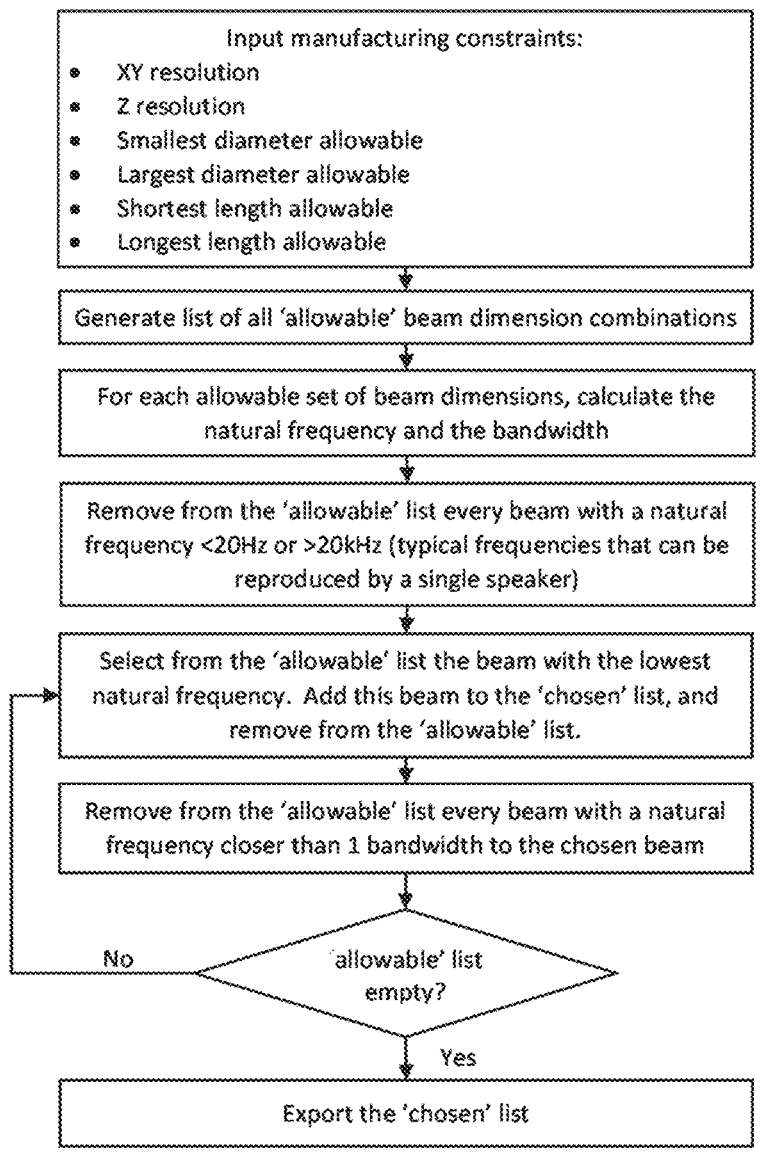
FIG. 5 illustrates a selection process for components of an exemplary haptic display system in accordance with an exemplary embodiment.

An exemplary optimization, for example the process shown in FIG. 5, may be implemented via customized software and/or hardware. In an exemplary embodiment, an optimization process may be run under conditions for a 'test' or 'scale model' device having a low resolution and able to be produced on a low-cost plastic 3D printer for testing purposes. The input and output parameters for an exemplary optimization run are reported in Table 1.

TABLE 1

Optimization Run 1 - PLA 'large-scale' device. These parameters are appropriate for a low-cost 3D printer-produced haptic display.

| Parameter | Value |
| --- | --- |
| Inputs | |
| Optimization approach | Lowest frequency first |
| Material | PLA |
| Density | 1250 kg/m³ |
| Modulus of Elasticity | 3.59 * 10^9 Pa |
| Damping ratio | 0.001 |
| Minimum allowable length | 70 mm |
| Maximum allowable length | 25 mm |
| Length (Z) Resolution | 0.1 mm |
| Minimum allowable diameter | 1.0 mm |
| Maximum allowable diameter | 1.5 mm |
| Diameter (XY) Resolution | 0.1 mm |
| Physical Spacing between pins | 2.0 mm |
| Frequency Spacing between pins | 2 * bandwidth |
| Outputs | |
| Maximum Number of Pins | 110 |
| Pixel Resolution | 10 × 10 |
| Physical Size of Device | 2 cm × 2 cm |

The device designed as in Table 1 was manufactured and tested. Table 3 below gives the actual lengths, diameters, and natural frequencies of all of the pins in this array.

Next, an optimization run may be performed using parameters appropriate to a 'final design' device. These parameters reflect manufacturing parameters on a high-cost metal manufacturing machine, such as a metal 3D printer, wire EDM, or other metal manufacturing method. In this design, the resolution in XY and the resolution in Z were both set at 0.01 mm, and the material utilized is stainless steel because of its good vibrational properties (high modulus of elasticity and low damping ratio). The optimization inputs and outputs are reported in Table 2.

TABLE 2

Optimization Run 2 - Stainless steel 'production' design. These parameters are appropriate for a high-end metal 3D printer-produced high-resolution production version of a haptic display.

| Parameter | Value |
| --- | --- |
| Inputs | |
| Optimization approach | Highest amplitude first |
| Material | Stainless Steel |
| Density | 7800 kg/m³ |
| Modulus of Elasticity | 210 * 10^9 Pa |
| Damping ratio | 0.0001 |
| Minimum allowable length | 0.1 mm |
| Maximum allowable length | 10 mm |
| Length (Z) Resolution | 0.01 mm |
| Minimum allowable diameter | 0.1 mm |
| Maximum allowable diameter | 0.5 mm |
| Diameter (XY) Resolution | 0.01 mm |
| Physical Spacing between pins | 0.6 mm |
| Frequency Spacing between pins | 2 * bandwidth |
| Outputs | |
| Maximum Number of Pins | 5917 |
| Pixel Resolution | 76 × 76 |
| Physical Size of Device | 4.5 cm × 4.5 cm |

The exemplary design illustrated in Table 2 allows a 76×76 pixel resolution device with a single speaker. Devices with a higher resolution than this can be designed, for example, by decreasing the maximum allowable diameter, reducing the frequency spacing to 1*bandwidth, and/or by placing multiple array/speaker combinations next to each other.

Pin Vibration Amplitude.

Figure 6:
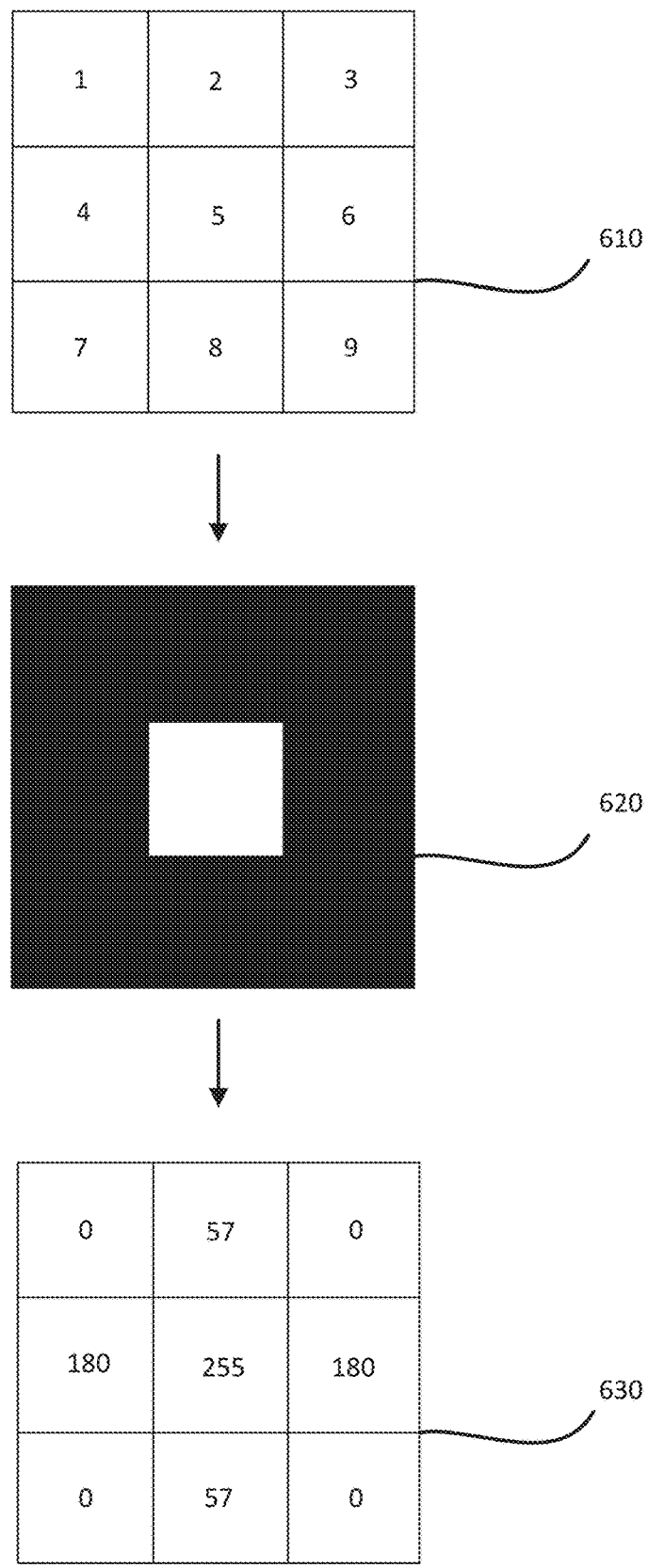
FIG. 6 illustrates an exemplary conversion of a greyscale image to byte values in accordance with an exemplary embodiment.

In an exemplary embodiment, after the pin array is attached to the voice coil of the speaker, sound is played through the speaker to actuate the pin vibration. The frequency of the sound selects which pin will vibrate, and the amplitude of the sound determines the amount of vibration. Many frequencies of sound can be played simultaneously to actuate many pins simultaneously. The amplitude of the sound is desirably modulated to account for the relative amplitude of vibration of each given pin. For example, note that in Table 3, pin 1 has a natural frequency of 379 Hz and a relative amplitude of 3.58, while pin 10 has a natural frequency of 408 Hz and a relative amplitude of 3.21. In order to accomplish an equal vibration of these two pins, two tones must be played through the speaker simultaneously: a 379 Hz tone and a 408 Hz tone. The 408 Hz tone should be played louder than the 379 Hz tone, at a ratio of 3.58/3.21. If the two tones are played at a different ratio of amplitudes, then one pin will vibrate more than the other. This effect may be used to represent different light levels in the original image. In a visual grayscale digital image, the level of light is represented by a single byte, typically consisting of 8 bits (this is known as '8-bit depth'). In the vibrational pin array, this byte is used as a multiplier on the amplitude of a sound frequency to increase or decrease the amount of vibration of a particular pin. For example, with reference to FIG. 6, suppose that an array of vibrational pins is made using only the first nine pins in Table 3, in the arrangement shown in element 610.

Now, suppose that the pin array designed as above will be used to represent a visual image shown in element 620. This representation shows how the image consisting of only nine pixels would look visually. Element 630 represents the equivalent byte values that would be stored by the computing device reading the digital image of element 620, i.e., a grayscale visual image and the byte values that would be stored by the computing device reading the digital image. Darker pixels have values closer to 0, while lighter pixels have values closer to 255.

Referencing the relative amplitudes and natural frequencies in Table 3, below, is the sound required to activate the pin arrangement from element 610 to represent the image shown in element 620. The frequency of each component wave corresponds to the natural frequency of each pin in the array, while the amplitude has two parts: first, the amplitude is scaled to account for the relative vibrational amplitude of each pin. Then, the amplitude is scaled to cause the vibrational amplitude of the pin to represent the light level of the pixel. The general rule for the calculation of each component of the voltage wave to the speaker is as shown in Eq. (1), where $V_x(t)$ is the $x^{th}$ component of the voltage wave, controlling the vibration of the $x^{th}$ pin.

$$V_x(t) = \left(\frac{1}{\text{relative amplitude}}\right)\left(\frac{\text{pixel byte value}}{255}\right)\sin(2\pi(\text{natural frequency})t) \quad (1)$$

Applying the rule in Eq. (1) to the images in Chart 1 and 2 and the values of the first pin array design reported in Table 3 gives the wave reported in Eq. (2):

$$V(t) = \left(\frac{1}{3.58}\right)\left(\frac{0}{255}\right)\sin(2\pi(379.29t)) + \left(\frac{1}{3.54}\right)\left(\frac{57}{255}\right)\sin(2\pi(382.34t)) + \left(\frac{1}{3.50}\right)\left(\frac{0}{255}\right)\sin(2\pi(385.43t)) + \left(\frac{1}{3.45}\right)\left(\frac{180}{255}\right)\sin(2\pi(388.56t)) + \left(\frac{1}{3.41}\right)\left(\frac{255}{255}\right)\sin(2\pi(391.72t)) + \left(\frac{1}{3.3}\right)\left(\frac{180}{255}\right)\sin(2\pi(394.93t)) + \left(\frac{1}{3.33}\right)\left(\frac{0}{255}\right)\sin(2\pi(398.17t)) + \left(\frac{1}{3.29}\right)\left(\frac{57}{255}\right)\sin(2\pi(401.46t)) + \left(\frac{1}{3.25}\right)\left(\frac{0}{255}\right)\sin(2\pi(404.78t)) \quad (2)$$

In an exemplary embodiment, the sound duration determines the tactile 'frame rate'. For this reason, evidence from human perception of visual video suggests that a sound duration of 1/30 second would provide sufficient perception of motion between images, but that lower frame rates may also be sufficient. A frame rate (sound duration) slower than 1/20 second would allow even the lowest-frequency pins (20 Hz) to complete at least one complete vibrational cycle before the sound is changed. However, any suitable frame rate may be utilized.

Table 3: Pin dimensions for the pin array designed according to the parameters in

TABLE 1

| Pin number | Length [mm] | Diameter [mm] | Natural frequency [Hz] | Relative Amplitude |
|---|---|---|---|---|
| 1 | 25 | 1 | 379.293 | 3.5869 |
| 2 | 24.9 | 1 | 382.3457 | 3.544 |
| 3 | 24.8 | 1 | 385.4353 | 3.5015 |
| 4 | 24.7 | 1 | 388.5626 | 3.4593 |
| 5 | 24.6 | 1 | 391.7281 | 3.4175 |
| 6 | 24.5 | 1 | 394.9324 | 3.376 |
| 7 | 24.4 | 1 | 398.1762 | 3.3348 |
| 8 | 24.3 | 1 | 401.4601 | 3.294 |
| 9 | 24.2 | 1 | 404.7848 | 3.2535 |
| 10 | 24.1 | 1 | 408.151 | 3.2133 |
| 11 | 24 | 1 | 411.5593 | 3.1735 |
| 12 | 23.9 | 1 | 415.0105 | 3.134 |
| 13 | 25 | 1.1 | 417.2224 | 2.4499 |
| 14 | 24.9 | 1.1 | 420.5803 | 2.4206 |
| 15 | 24.8 | 1.1 | 423.9789 | 2.3916 |
| 16 | 24.7 | 1.1 | 427.4189 | 2.3628 |
| 17 | 23.5 | 1 | 429.2588 | 2.9792 |
| 18 | 23.4 | 1 | 432.9355 | 2.9414 |
| 19 | 23.3 | 1 | 436.6596 | 2.9038 |
| 20 | 23.2 | 1 | 440.4321 | 2.8666 |
| 21 | 23.1 | 1 | 444.2536 | 2.8297 |
| 22 | 23 | 1 | 448.1251 | 2.7931 |
| 23 | 22.9 | 1 | 452.0474 | 2.7568 |
| 24 | 25 | 1.2 | 455.1517 | 1.7298 |
| 25 | 24.9 | 1.2 | 458.8148 | 1.7091 |
| 26 | 24.8 | 1.2 | 462.5224 | 1.6886 |
| 27 | 24.7 | 1.2 | 466.2751 | 1.6683 |
| 28 | 23.6 | 1.1 | 468.1916 | 2.0609 |
| 29 | 24.6 | 1.2 | 470.0737 | 1.6481 |
| 30 | 23.5 | 1.1 | 472.1846 | 2.0349 |
| 31 | 23.4 | 1.1 | 476.229 | 2.009 |
| 32 | 23.3 | 1.1 | 480.3256 | 1.9833 |
| 33 | 23.2 | 1.1 | 484.4753 | 1.9579 |
| 34 | 23.1 | 1.1 | 488.6789 | 1.9327 |
| 35 | 23 | 1.1 | 492.9376 | 1.9077 |
| 36 | 24.9 | 1.3 | 497.0494 | 1.2409 |
| 37 | 24.8 | 1.3 | 501.066 | 1.226 |
| 38 | 21.7 | 1 | 503.4258 | 2.3457 |
| 39 | 22.7 | 1.1 | 506.0528 | 1.834 |
| 40 | 21.6 | 1 | 508.0979 | 2.3135 |
| 41 | 22.6 | 1.1 | 510.5411 | 1.8099 |
| 42 | 21.5 | 1 | 512.8354 | 2.2815 |
| 43 | 22.5 | 1.1 | 515.0893 | 1.786 |
| 44 | 24.4 | 1.3 | 517.629 | 1.1676 |

TABLE 1-continued

| Pin number | Length [mm] | Diameter [mm] | Natural frequency [Hz] | Relative Amplitude |
|---|---|---|---|---|
| 45 | 24.3 | 1.3 | 521.8981 | 1.1533 |
| 46 | 23.3 | 1.2 | 523.9916 | 1.4004 |
| 47 | 24.2 | 1.3 | 526.2202 | 1.1391 |
| 48 | 23.2 | 1.2 | 528.5185 | 1.3824 |
| 49 | 25 | 1.4 | 531.0103 | 0.9337 |
| 50 | 22.1 | 1.1 | 533.9038 | 1.6924 |
| 51 | 21 | 1 | 537.5468 | 2.126 |
| 52 | 22.9 | 1.2 | 542.4568 | 1.3295 |
| 53 | 22.8 | 1.1 | 547.2257 | 1.3121 |
| 54 | 22.7 | 1.2 | 552.0577 | 1.295 |
| 55 | 22.6 | 1.2 | 556.9539 | 1.2779 |
| 56 | 22.5 | 1.2 | 561.9156 | 1.261 |
| 57 | 24.2 | 1.4 | 566.6987 | 0.8469 |
| 58 | 21.4 | 1.1 | 569.4034 | 1.5366 |
| 59 | 22.3 | 1.2 | 572.04 | 1.2277 |
| 60 | 21.3 | 1.1 | 574.7624 | 1.5152 |
| 61 | 22.2 | 1.2 | 577.2052 | 1.2113 |
| 62 | 21.2 | 1.1 | 580.1975 | 1.494 |
| 63 | 23 | 1.3 | 582.5626 | 0.9779 |
| 64 | 21.1 | 1.1 | 585.7101 | 1.4729 |
| 65 | 23.7 | 1.4 | 590.8623 | 0.7955 |
| 66 | 23.6 | 1.4 | 595.8802 | 0.7855 |
| 67 | 21.8 | 1.2 | 598.5813 | 1.147 |
| 68 | 20.8 | 1.1 | 602.7274 | 1.411 |
| 69 | 23.4 | 1.4 | 606.1097 | 0.7657 |
| 70 | 20.7 | 1.1 | 608.5649 | 1.3907 |
| 71 | 23.3 | 1.4 | 611.3235 | 0.7559 |
| 72 | 22.4 | 1.3 | 614.1893 | 0.9034 |
| 73 | 22.3 | 1.3 | 619.71 | 0.8913 |
| 74 | 22.2 | 1.3 | 625.3056 | 0.8794 |
| 75 | 22.1 | 1.3 | 630.9773 | 0.8676 |
| 76 | 22 | 1.3 | 636.7265 | 0.8558 |
| 77 | 21.9 | 1.3 | 642.5546 | 0.8442 |
| 78 | 20.1 | 1.1 | 645.4394 | 1.2733 |
| 79 | 21.8 | 1.3 | 648.4631 | 0.8327 |
| 80 | 20.9 | 1.2 | 651.2438 | 1.0107 |
| 81 | 21.7 | 1.3 | 654.4535 | 0.8213 |
| 82 | 20.8 | 1.2 | 657.5208 | 0.9962 |
| 83 | 21.6 | 1.3 | 660.5273 | 0.81 |
| 84 | 20.7 | 1.2 | 663.889 | 0.9819 |
| 85 | 21.5 | 1.3 | 666.686 | 0.7988 |
| 86 | 20.6 | 1.2 | 670.3501 | 0.9678 |
| 87 | 22.2 | 1.4 | 673.406 | 0.6538 |
| 88 | 20.5 | 1.2 | 676.9061 | 0.9538 |
| 89 | 20.4 | 1.2 | 683.5587 | 0.9399 |
| 90 | 20.3 | 1.2 | 690.3099 | 0.9261 |
| 91 | 20.2 | 1.2 | 697.1615 | 0.9125 |
| 92 | 20.1 | 1.2 | 704.1157 | 0.899 |
| 93 | 20 | 1.2 | 711.1745 | 0.8857 |
| 94 | 21.5 | 1.4 | 717.9695 | 0.5939 |
| 95 | 21.4 | 1.4 | 724.6952 | 0.5856 |
| 96 | 21.3 | 1.4 | 731.5158 | 0.5775 |
| 97 | 21.2 | 1.4 | 738.4332 | 0.5694 |
| 98 | 21.1 | 1.4 | 745.4492 | 0.5614 |
| 99 | 21 | 1.4 | 752.5656 | 0.5534 |
| 100 | 20.9 | 1.4 | 759.7844 | 0.5455 |

Validation of Device and Method Functionality.

In order to validate the functionality of exemplary devices and methods disclosed herein, a prototype was built comprising a pin array with nine pins made utilizing an EDM technique. The dimensions of the nine pins were selected such that each of the nine pins would have a unique natural frequency. The pin array was then attached to a speaker's surface transducer, which was then connected to a function generator programmed to produce a continuous sweep of sound frequencies between the lowest and highest natural frequencies of the pin array. During the frequency sweep, the pin array was recorded by a high speed camera recording at approximately 7100 frames/second. The video was processed utilizing an image processing algorithm to determine the location of the top of each pin in each frame.

Figure 7:
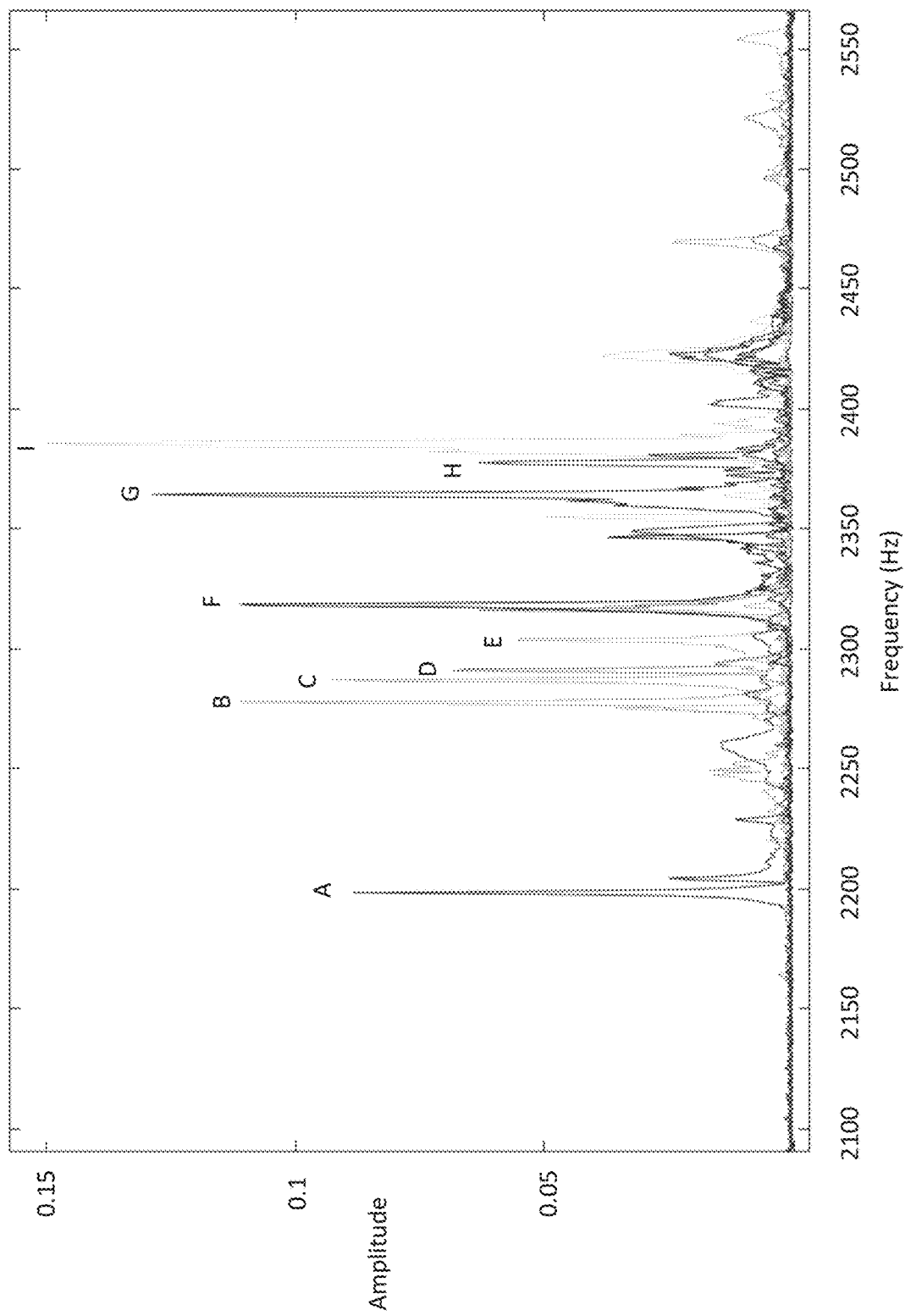
FIG. 7 illustrates a graphical depiction of nine pins shown to not comprise overlapping natural frequencies in accordance with an exemplary embodiment.

FIG. 7 depicts a graph illustrating the results of the above validation. As can be seen, the frequency and relative amplitude of each of the nine pins (designated A-I) are measured and plotted against each other. Each of the pins are plotted with a different shade of gray to compare the results. Each of the nine pins exhibited unique natural frequencies in the frequency range as indicated by the various 'spikes' in the graphs.

Figure 8:
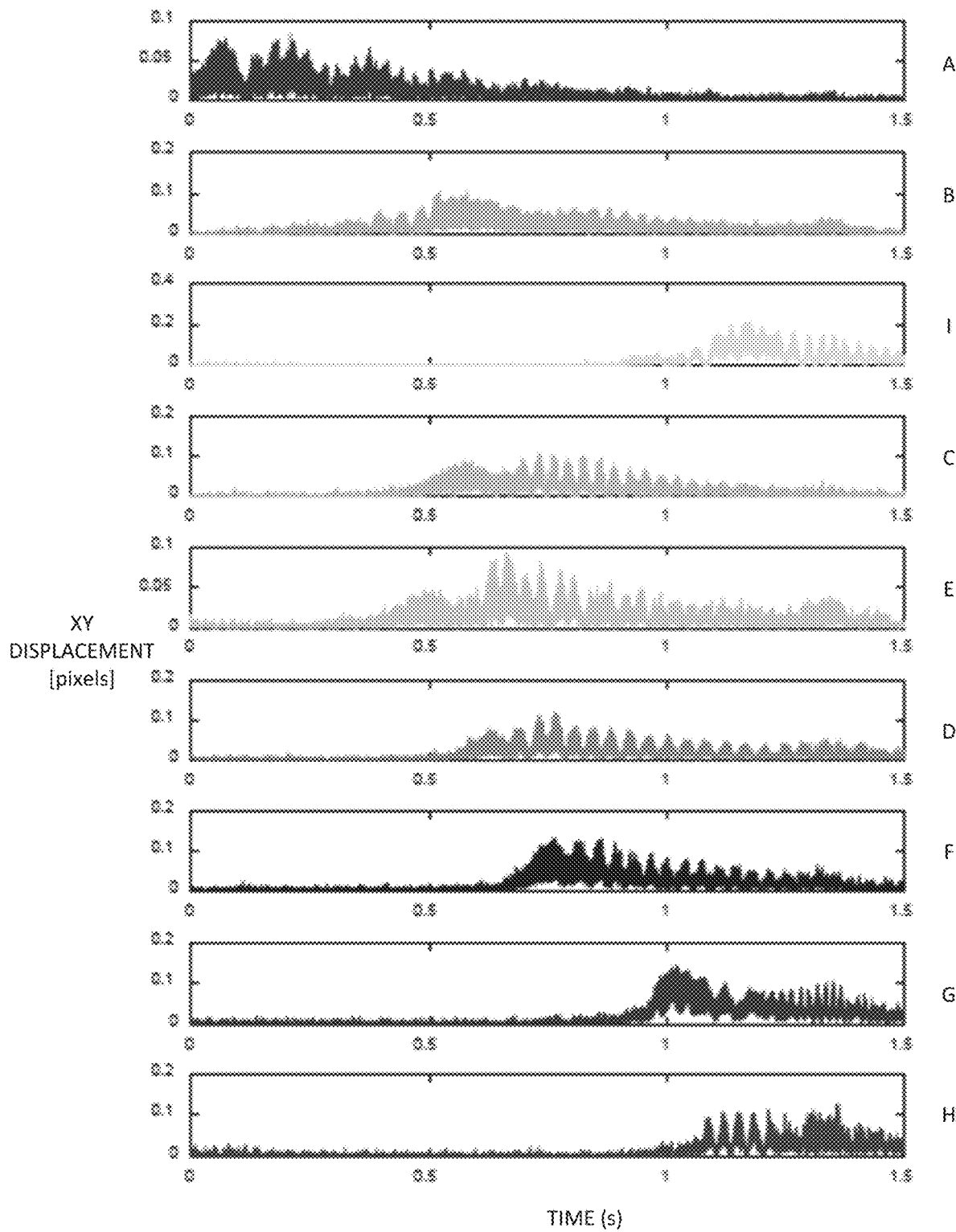
FIG. 8 illustrates the nine pins of FIG. 7 vibrating at different times in accordance with an exemplary embodiment.

FIG. 8 depicts another graph illustrating the results of the above validation. FIG. 8 contains nine plots corresponding to each of the nine pins (again designated A-I). Each plot displays the displacement of each pin in the XY plane against time. As can be seen, each of the nine pins began vibrating at different times during the frequency sweep. As can be seen, effective operation of the haptic display is demonstrated.

Time Constraints.

As previously stated, in order to use an exemplary pin array of a haptic display to display an image, it is desirable to convert a visual image into a soundwave in which the brightness of each pixel corresponds to sound amplitude and the location of each pixel in the image corresponds to sound frequency. Such a process may be computationally intensive and, to facilitate smooth operation of the haptic display, is desirably performed at a rate that is commensurate with a 'frame rate' in a video stream. In other words, a soundwave corresponding to an image shall be able to be calculated and produced in approximately 0.033 seconds in order to represent a video with 30 frames/second with a resonance-based vibratory haptic display. In order to do so, code may be written to perform required calculations and record the amount of time the calculations required. In exemplary embodiments, only pixels that change from one image to the next may be included in subsequent calculations in order to increase frame rate or decrease processing time. In other words, converting brightness values for each pixel may comprise only converting brightness values for pixels that change relative to a previous image. Computing threading, grayscale bit-depth reduction, soundwave lookup tables, and/or other methods may be used to reduce processing time.

While the principles of this disclosure have been shown in exemplary embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to exemplary embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to exemplary embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

When language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A haptic display system, comprising:
   an array of vibratory elements, each vibratory element having a natural frequency different from the natural frequency of every other vibratory element in the array;
   a voice coil coupled to the array to impart vibrational energy to the array; and
   a microcontroller coupled to the voice coil to drive the array,
   wherein each vibratory element comprises a length different from every other vibratory element in the array.

2. The haptic display system of claim 1, wherein the array of vibratory elements further comprises a base coupled to each of the vibratory elements.

3. The haptic display system of claim 1, wherein each vibratory element comprises a diameter different from every other vibratory element in the array.

4. The haptic display system of claim 1, wherein each vibratory element comprises the same material.

5. The haptic display system of claim 1, wherein each vibratory element is configured with one of a circular or rectangular cross-sectional shape.

6. The haptic display system of claim 1, wherein each vibratory element is produced by one of fused deposition modeling, stereolithography, direct metal laser sintering, electrical discharge machining, or a wire drawing machining process.

7. The haptic display system of claim 1, wherein the array of vibratory elements comprises a grid of vibratory elements comprising multiple rows and multiple columns.

8. An interface for a haptic display system, the interface comprising:
   a plurality of circular apertures; and
   a plurality of rectangular apertures wherein each rectangular aperture of the plurality of rectangular apertures is configured to receive a vibratory element of an array of vibratory elements, wherein the interface is configured to prevent a user's skin from excessively damping vibrations of the array of vibratory elements.

9. The interface of claim 8, wherein the plurality of circular apertures are configured to receive a threaded rod and position the interface relative to the array of vibratory elements.

10. The interface of claim 8, wherein a length of each rectangular aperture of the plurality of rectangular apertures is approximately twice a length of each vibratory element of the array of vibratory elements.

11. The interface of claim 8, wherein the array of vibratory elements are configured to vibrate in one direction in the plurality of rectangular apertures.

12. The interface of claim 8, wherein the interface is configured to allow the array of vibratory elements to excite a user's dynamic touch receptors.

13. A method for displaying a digital image via a haptic display system, the method comprising:
   converting a brightness value for each pixel of the digital image into an amplitude;
   matching a location of each pixel in the image to the location of a vibratory element in an array of vibratory elements in the haptic display system, each vibratory element having a natural frequency different from the natural frequency of every other vibratory element in the array; and
   energizing the array of vibratory elements to cause each vibratory element to vibrate with an amplitude proportional to the brightness value of the corresponding pixel.

14. The method of claim 13, further comprising inserting the array of vibratory elements into an interface configured to prevent a user's skin from damping vibration of the vibratory elements.

15. The method of claim 13, wherein converting a brightness value for each pixel comprises only converting a brightness value for each pixel that changes relative to a previous image.

16. The method of claim 13, wherein each vibratory element has a natural frequency falling within a range of frequencies that can be produced by a single speaker.

* * * * *